Oct. 18, 1966  E. G. HUBBARD  3,279,862
CONVEYING MEANS AND METHOD
Filed March 11, 1964  2 Sheets-Sheet 1
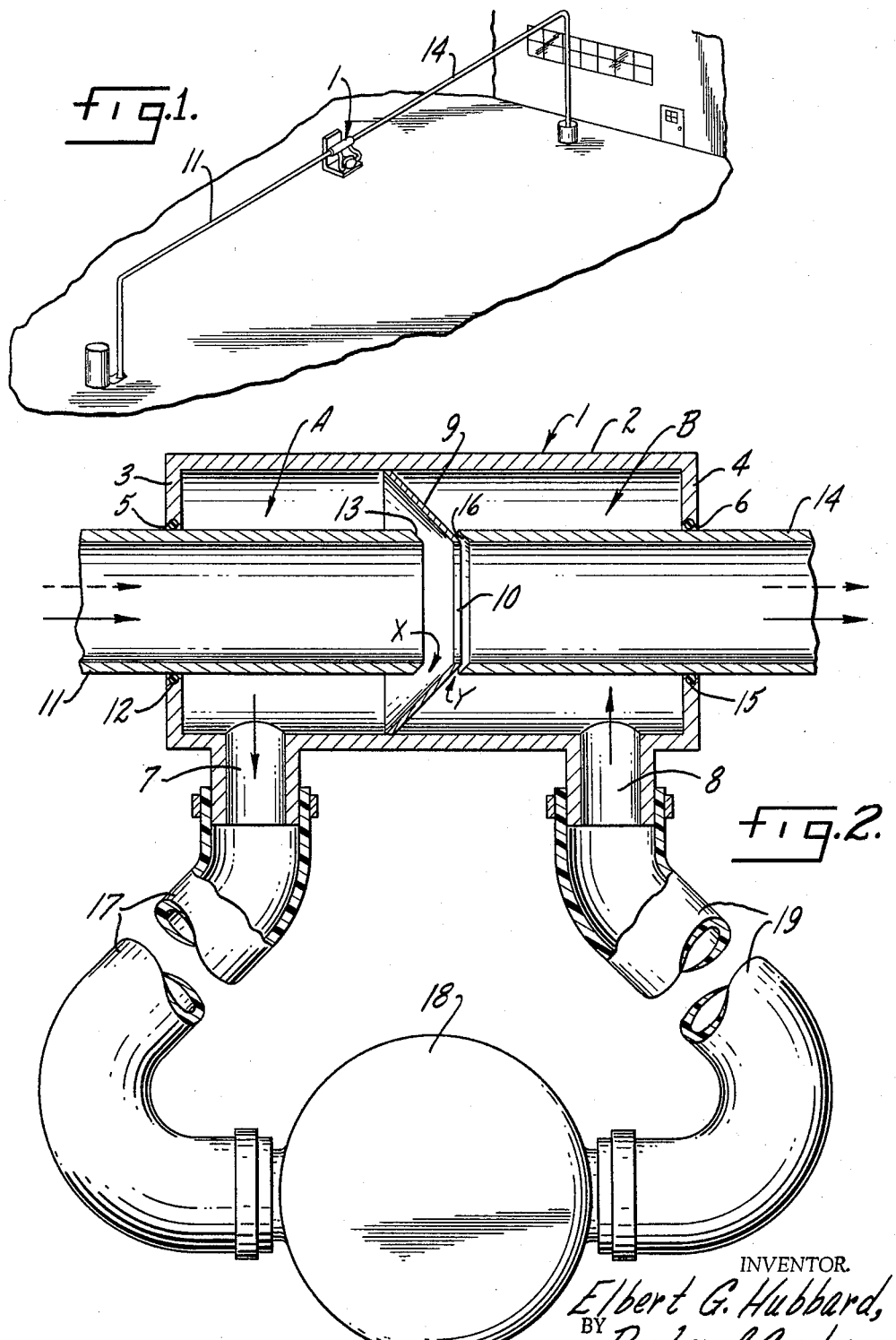
INVENTOR.
Elbert G. Hubbard,
BY Parker & Carter
Attorneys.

Oct. 18, 1966  E. G. HUBBARD  3,279,862
CONVEYING MEANS AND METHOD
Filed March 11, 1964  2 Sheets-Sheet 2
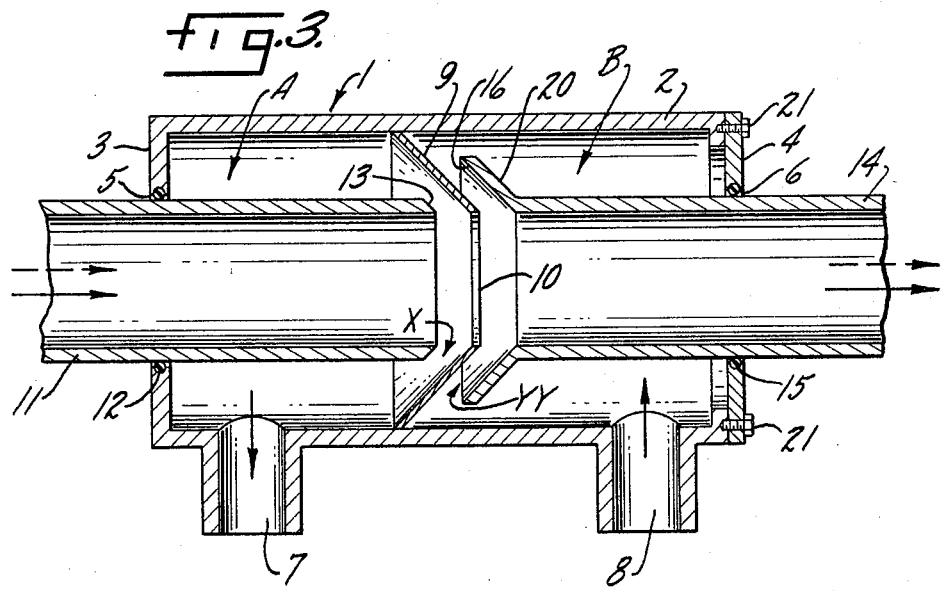
INVENTOR.
Elbert G. Hubbard,
BY Parker & Carter
Attorneys.

United States Patent Office 3,279,862
Patented Oct. 18, 1966

3,279,862
CONVEYING MEANS AND METHOD
Elbert G. Hubbard, Maywood, Ill., assignor, by mesne assignments, to Goodman Manufacturing Company, Chicago, Ill., a corporation of Illinois
Filed Mar. 11, 1964, Ser. No. 351,094
6 Claims. (Cl. 302—23)

This invention relates to conveying systems and particularly to pneumatic conveying systems.

One purpose of the invention is to provide a means and method for conveying dry material.

Pneumatic conveying systems for dry materials have for many years been of two basic types. Conventionally dry materials have been moved through suitable conduits either by the employment of positive air pressure adjacent a forward portion of the conduit system or by a negative pressure or vacuum positioned adjacent the outlet end of the system. In relation to the pressure system it is relatively easy to separate the dry material from the air at the delivery point or discharge outlet of the system, but the difficulties involved in injecting the material into the air pressure stream at the system inlet or entry has required the provision of space-consuming, expensive and complicated equipment having a number of moving parts, such as rotary feeders and the like. Similarly, in connection with the vacuum system, it has proved relatively easy to inject the material at the ingress or inlet end of the system, but separation of the material from the air stream at the delivery or outlet point has required the provision of space-consuming, expensive mechanisms such as centrifugal separators and the like. Accordingly, it is another purpose of the invention to provide a means and method which shall obviate both the discharge problem of the vacuum system and the entry problem of the pressure system.

A venturi type of mechanism has been suggested in the past, but such mechanisms are subject to numerous disadvantages, one of said disadvantages being the instability of the vacuum produced at the intake or feed end of the conveying conduit. Similarly, the amount of vacuum forces producible by a venturi is insufficient to provide effective conveying of large quantities at high rates or volumes per hour of various materials over substantial distances. Such systems are subject to plugging and the materials being conveyed may be damaged by impact with inclined surfaces within the conduit. Accordingly, it is another purpose of the invention to provide a conveying system effective to convey large quantities at high volume and high speed over a substantial distance without damage to the materials being conveyed and to provide such a system effective to convey a wide variety of materials through a conduit of a continuous, unbroken, "straight-through" or open diameter.

It is another purpose to provide a conveying means and method wherein a reduced pressure or vacuum force is effective to pick up and convey a wide variety of materials, without damage thereto, over a substantial distance and immediately thereafter to convey said materials further by the employment of a positive-pressure or direct-pressure force.

Pneumatic systems of a continuous inner diameter have been provided in the past for transmittal, by differential pressures, of a carrier in which items to be conveyed were placed. A common example thereof is the pneumatic system employed in department stores and the like for transmitting carriers in which documents are sealed. Such carriers incorporate one or more flanges in contact with the inner surfaces of the conduit throughout the conveying system and function as a type of piston. It is, however, one of the objects of the invention herein to provide a conveying means and method employing a continuous diameter throughout the system and yet capable of conveying a wide variety of materials of varying natures, shapes, sizes and weights in and by the air stream alone and without contact with the walls of the conduit and without the employment of carrier elements of any kind.

There have also been suggestions of a conveying system wherein the major conveying force was a type of aspiration and in which a small amount of the air within the conduit upstream of the aspirating station was removed by suction from the line. Some of such suggested systems have incorporated, however, the carrier above-described and some of such suggested systems have relied upon the addition of air from an outside source. Such systems have also required the reliance upon venturi configurations in the conduit and upon suction by aspiration across a transition zone of a diameter just sufficient to receive the item conveyed. It is one purpose of the present invention to provide a substantially closed system in which substantially all of the air in the upstream portion of the conveying conduit is exhausted therefrom to create a conveying air stream at high velocity in said upstream portion and in which said air is returned substantially immediately to the conduit to create a downstream force of pressure air and without reliance upon venturis, reduced-diameter suction or transition zones or pistonlike contact of the conveyed item with any inner surfaces of the system.

Another purpose is to provide a conveying means and method in which materials are conveyed by, and as a part of, a continuous air stream of continuous air stream of constant diameter.

Another purpose is to provide a conveying means and method effective to convey a wide range of materials ranging in size from that of granulated sugar to items of a size equaling approximately 80 percent of the conduit diameter employed in the system.

Another purpose is to provide a conveying means and method effective to convey items carrying in weight from approximately 2 pounds per cubic foot to approximately 150 pounds per cubic foot.

Another purpose is to provide a conveying means and method effective to convey materials in a conduit having an inner diameter of a constant dimension which may preferably be within the range and order of from 2 inches to 8 inches.

Another purpose is to provide a conveying means and method effective to convey materials at a rate within the range and order of from one-half ton to twenty-five tons per hour.

Another purpose is to provide a means and method of conveying pneumatically a wide variety of fragile materials not previously considered subject to pneumatic conveying of the nature, for example, of dry cereals, dry spaghetti, aspirin tablets, gum pellets, peanuts, marshmallows, and the like.

Another purpose is to provide a means and method of conveying pneumatically, and in an economically feasible volume, a wide variety of additional materials not previously considered subject to pneumatic conveying of the nature, for example, of nails, small plastic items and the like.

Another purpose is to provide a means for pneumatically conveying dry materials which shall be subject to exceptionally low maintenance and operating costs.

Another purpose is to provide a means and method of conveying dry materials in which a maximum amount of horsepower expended is employed directly in the conveying of materials.

Another purpose is to provide a means and method of conveying dry materials wherein the material moves straight through the entire system without being required to go through fans, venturis, valves, blades or the like.

Another purpose is to provide a means for conveying dry materials in which a single housing is provided for creating of both vacuum and pressure plenum chambers.

Another purpose is to provide a conveying means which is creative of an abrupt, substantially immediate transition between vacuum and pressure zones.

Another purpose is to provide a conveying means capable of employing the full vacuum and pressure forces of a vacuum-pressure generator in a conveying function without interference between the two forces within a conveying conduit.

Another purpose is to provide a conveying means effective to create a substantially immediate exchange of vacuum and pressure working upon the materials being conveyed.

Another purpose is to provide a conveying means which avoids the employment of a long transition zone through which articles being conveyed must move.

Another purpose is to provide a means for conveying materials which employs a single conical baffle, the opposite sides of which are effective to direct both a vacuum and pressure stream respectively out of and into a conduit.

Another purpose is to provide a conveying means effective to produce the uniform, maximum change of direction of air exiting the upstream conveyor conduit portoin; to divert the suction stream quickly out of the conduit without short-circuiting; to produce maximum change of direction facilitating the separation of materials conveyed from the air particles, and to minimize degradation of brittle conveyed materials by retaining the same adjacent the center of the conduit and away from the inner surfaces thereof.

Another purpose is to provide a conveying means effective to produce maximum change of direction of pressure air entering a downstream conveyor conduit; to provide uniform entrance of pressure air into the conduit and to create a sharp, effective, conical curtain of air in the pressure conduit effective to form an air lock against the withdrawal of air adjacent thereto.

Another purpose is to provide a conveying means having a pressure inlet orifice of maximum adjustability.

Another purpose is to provide a conveying means effective in any position.

Another purpose is to provide a means and method for pneumatically conveying dry materials which shall be of maximum simplicity and economy in manufacture.

Another purpose is to provide a means and method for conveying dry materials which shall be productive of minimum damage to the materials being conveyed.

Another purpose is to provide a means and method for pneumatically conveying dry materials which may be employed at any point in a total conveying system.

Another purpose is to provide a means and method for pneumatically conveying materials which shall avoid the need for specific location of air pressure or vacuum sources.

Another purpose is to provide a means and method for conveying materials wherein the materials being conveyed are free of contact by moving parts.

Another purpose is to provide a means and method for conveying materials wherein separation of some air and material particles occurs during a minimum portion of the travel of the dry materials through the system.

Another purpose is to provide a means and method for conveying dry materials wherein said materials are subjected solely to vacuum, said vacuum is entirely withdrawn and said materials are then subjected solely to pressure.

Another purpose is to provide an in-line means and method for conveying dry materials.

Another purpose is to provide a means and method for conveying dry materials wherein momentum may be provided to said materials by vacuum forces, said vacuum forces may be withdrawn from said materials and said materials may be subjected to pressure forces of minimum relative magnitude.

Another purpose is to provide a means and method for conveying dry materials such that said means may be installed and said method may be practiced at substantially any desired location in the route over which said materials are to be conveyed.

Another purpose is to provide a means and method for conveying dry materials which avoid deflection in the direction of movement of the materials being conveyed.

Other purposes will appear from time to time during the course of the specification and claims.

The invention is illustrated more or less diagrammatically in the accompanying drawings wherein:

FIGURE 1 is a perspective view illustrating a system of the invention;

FIGURE 2 is a side elevation in cross section, on an enlarged scale, and illustrating a vacuum-pressure exchange unit of the invention; and FIGURE 3 is a view similar to that of FIGURE 2 and illustrating a variant form of the invention.

Like parts are indicated by like numerals throughout the specification and drawings.

Referring now to the drawings, and particularly to FIGURE 1, the numeral 1 generally designates a housing. While the over-all shape of housing 1 may take a variety of forms without departing from the nature and scope of the invention, it has been found preferable to form the housing 1 of a cylindrical wall 2, and a pair of end walls 3, 4. An aperture 5 is formed centrally in wall 3 and an aperture 6 is formed centrally in wall 4 in alignment with aperture 5. An outlet passage 7 is formed in wall 2 adajacent wall 3 and an inlet passage 8 is formed in wall 2 adjacent wall 4. Secured within the housing 1 is a frusto-conical baffle 9 formed of relatively thin material and inclined toward the wall 4. The baffle 9 has a central aperture 10.

Positioned in aperture 5 is an upstream conveyor conduit 11. A seal member 12 is shown as carried by wall 3 for engagement with the outer surface of conduit portion 11. The inner end edge 13 of conduit 11 is chamfered rearwardly at substantially the angle of baffle 9 and is spaced therefrom to create an annular vacuum withdrawal passage X. The passage X communicates the area within conduit 11 with the forward portion of a vacuum chamber A formed in housing 1 between baffle 9 and wall 3, the outlet passage 7 communicating with a rearward portion of chamber A.

Extending into housing 1 through aperture 6 is a downstream conduit portion 14. A seal 15 is shown as carried by wall 4 for engagement with the outer surface of conduit portion 14. The inner end edge 16 of conduit portion 14 is chamfered for parallelism with the opposed, spaced surface of baffle 9 to create an air pressure inlet nozzle passage Y communicating the area within conduit portion 14 with the area portion of a pressure chamber B formed in housing 1 between baffle 9 and wall 4, the inlet passage 8 communicating with a forward portion of chamber B. It will be observed that the inner diameters of upstream conduit portion 11, baffle aperture 10, and downstream conduit portion 14 are identical and continuous. As indicated above with respect to housing 1, it is preferable to form conduits 11 and 14 as tubular members and to employ a circular aperture 10.

Outlet passage 7 communicates, through a suitable hose or conduit 17, with the suction or vacuum side of a closed vacuum-pressure generator 18 which may be an air pump or blower mechanism. It will be understood that the mechanism 18 may take a variety of forms without departing from the nature and scope of the invention. The mechanism 18 is, however, productive of a reduced pressure, suction or vacuum force at passage 7, and productive of a positive or direct pressure force through a suitable hose or conduit 19 which is in turn communicated with passage 8 for delivery of fluid pressure to a forward portion of chamber B, the illustrated mechanism 18 taking its entire intake from chamber A and delivering its entire output into chamber B.

Conduit portions 11, 14 are shown as slidably positioned in apertures 5, 6 for appropriate adjustment of annular nozzle passages X and Y.

In FIGURE 2, a variant form of the invention is illustrated. Since many of the parts illustrated in FIGURE 2 correspond to those illustrated in FIGURE 1, they are, for convenience and clarity, given the same reference numerals. The inner end of conduit portion 14, however, has formed thereon a bell-mouth structure comprising a generally conical flange 20 inclined in parallelism with baffle 9, the purpose of which will appear hereinbelow. In the structure of FIGURE 2, the end wall 4 is shown as separately attachable to the cylindrical wall 2, as by the fasteners 21, for each in inserting the flange 20 into housing 1.

In the operation of the invention materials to be conveyed are presented to the inlet of conduit 11. The materials may be presented in any suitable manner, it being only necessary that they approach the open inlet end of conduit 11 closely enough to be drawn thereinto with the air being drawn into conduit 11 and into the air stream created thereby. It will be understood that the conduit 11 may vary greatly in length, the mechanism 18 being effective to produce sufficient vacuum in chamber A and to communicate said vacuum to the entire area within conduit portion 11 to draw the materials to be conveyed thereinto over a substantial range of distances varying from a few to many feet. The vacuum, or reduced pressure, is drawn through the annular conical nozzle formed by the rear surface of baffle 9 and the opposed edge 13 of conduit portion 11. Since the outlet passage 7 is spaced rearwardly from the passage X the air within chamber 11 is drawn substantially uniformly at all points throughout and about and over the outlet edge circumference of conduit portion 11. Thus a rapid maximum direction change, diverting suction air quickly and uniformly, is accomplished and the materials being conveyed therethrough are thus not subjected to side or deflecting forces, the materials remaining free to pass substantially centrally through and out of the conduit portion 11 without contact with the inner surface thereof.

Thus materials are conveyed throughout the length of conduit 11 by and as a part of an air stream created therein by vacuum forces alone. The conveying action in conduit 11 is positive, stable and effective. Materials are conveyed through conduit 11 at desired predetermined velocities as high as the order of 9000 feet per minute.

The relatively thin baffle 9 creates a thin, abrupt transition between the vacuum area or zone in conduit 11 and the pressure area or zone in conduit 14, as well as dividing and creating vacuum chamber A and pressure chamber B within housing 1. The inner circular edge of baffle 9 surrounding and defining aperture 10 creates a minimal transition zone in the total conduit assembly 11, 14 through which the particles being conveyed are required to move. The employment of baffle 9 permits of maximum compactness and economy as well as simplicity in the manufacture and employment of the invention. The opposite conical surfaces of the baffle 9 direct both the vacuum and pressure streams, respectively, out of and into conduit 11, 14 and form, with opposed edges of conduits 11, 14, the withdrawal passage X and entry nozzle passage Y.

Inlet passage 8 delivers a positive air pressure from mechanism 18 to a forward portion of chamber B, filling the chamber and delivering fluid pressure uniformly against the surface of baffle 9 for maximum and uniform change of direction of pressure air for delivery into annular nozzle passage Y. It will be observed that nozzle passage Y is of reduced width relative to passage X and is creative of a uniform, sharp, effective conical curtain of air entering conduit portion 14. The creation of the said conical curtain of air serves as an air lock effective to create positive pressure forces in conduit portion 14 for conveying of materials through a substantial distance therein and for insuring against a short-circuiting of the pressure air back through the vacuum outlet passage X.

With respect to the form of the invention illustrated in FIGURE 3, it will be seen that the outwardly flared conical flange 20 on conduit portion 14 is effective to create a nozzle passage YY of greater length than the passage Y illustrated in FIGURE 2. The provision of a longer nozzle passage permits of a greater width variation therein. It will be seen that the flange 20 may be moved a greater distance from the baffle cone 9 while retaining the inclined nature of the thus-widened passage YY. If conduit portion 14 be moved outwardly of housing 1 a distance such that the forwardmost edge of baffle 9 is spaced from the rearmost edge of conduit 14, it will be realized that a lateral passage is created into conduit 14 from chamber B. Such lateral passage tends to weaken the conical nature, and thus the air lock function of the air curtain directed through passage Y into conduit 14. The form of the invention illustrated in FIGURE 3 thus permits a greater separation of conduit portion 14 and baffle 9 without creating such lateral passage. It will be realized that excessive separation of edge 16 or flange 20 from baffle 9 will defeat the creation of the air curtain lock and will produce a short-circuiting of the system in which air pressure entering chamber B is drawn into and through nozzle passage X to chamber A and returned to mechanism 18 through passage 7 and conduit 17.

Thet nozzle passage X may be varied by slidable adjustment of conduit 11 in aperture 5. The widths of nozzle passage X may be varied in accordance with the variable factors involved such as the velocity of the air stream to be created in conduit portion 11 and the nature, weight and volume of the materials to be conveyed.

With reference to the materials being conveyed, it is known that materials having a moisture content approximating 7 percent or higher are extremely difficult to convey pneumatically because of the tendency of such materials to adhere to each other and to the inner walls of a conveying system. In general, therefore, the invention is applicable to dry materials, the word "dry" being defined herein as materials having less than approximately 7 percent moisture content.

Similarly, it will be understood that certain dry materials are of such powdery or fine mesh and lightweight particles as to make the separation thereof from air particles in the stream with which they are being conveyed so difficult as to require special equipment. Such fine mesh or powdery materials, if conveyed in the system of the present invention, could, in part, pass through outlet nozzle X, passage 7, and into mechanism 18. Said particles would be returned through passage 8 to chamber B and nozzle passage Y into passage 14. Experience has shown that approximately 20 percent of such fine particles would pass through outlet passage 7 and into the blower or air pump mechanism 18. Some of said particles would tend to adhere to the mechanism 18 and, where passage through a mechanism 18 or adherence thereto is undesirable, it is not expected that the structure of the present invention would be employed in conveying such powdery or fine mesh materials. By "powdery" or "fine mesh" particles, reference is made, for example, to particles of a size less than that of granulated sugar.

The diameter of conduit 11, aperture 10, and conduit 14, as well as the amount of vacuum type action created in conduit 11 and pressure action created in conduit 14, will be varied, by those skilled in the art, in relation to the weight, nature and particle size of the material to be conveyed, as well as in relation to the quantity of material required to be conveyed in any given increment of time and the distance over which the material is to be conveyed.

To the materials being conveyed within conduit portion 11 under the influence of the vacuum created by mechanism 18 is imparted a substantial kinetic energy or momentum. The materials are conveyed by, with and as a part of a suction air stream which may, for example, move at rates of the order of 500 to 9,000 feet per minute. Said material flash past the nozzle X and through the aperture 10 in baffle 9 without apparent reduction in speed or directional deflection of any kind. Said materials then immediately enter conduit 14 and are subjected to the force of the conical air currtain entering, at an initial high velocity, conduit 14 through annular nozzle passage Y. Since the air enters uniformly through nozzle Y the materials are not deflected directionally. Thenceforward the materials are conveyed at substantially the same velocity as in conduit 11 through conduit 14 by and as a part of the pressure air stream produced therein to a point of delivery. No need exists at the delivery point of any separation mechanism, since the materials may be simply allowed to flow out of the outlet end of conduit 14 into or upon any suitable receiver. Throughout the entire conveying excursion the materials are at no time subject to impact with venturi surfaces, valve plates, rotating blades or any other obstructions.

It will be understood that the structure of FIGURES 1 or 2 may be applied downstream in conduit 14 when it is desired to convey materials over an extremely long distance, the simplicity and economy of the structure of the invention being effective to permit such duplication, where necessary. Since, however, the means and method of the invention are effective to convey materials over a substantial distance, the requirement for additional installations of the transfer structures shown in the drawings herein is expected to be rare.

It will be noted that a generally closed vacuum-pressure system is employed, requiring the addition of no air into chamber B or into mechanism 18 from an outside source. It will be further noted that conveyance of materials in conduit 11 is caused by a strong vacuum produced therein and drawn therefrom through annular nozzle passage X, all of the air drawn from chamber A being returned to chamber B by mechanism 18 and returned through annular nozzle passage Y to conduit 14. It has been found that the method of the invention permits the employment of minimal direct pressure forces. For example, materials have been conveyed at high velocities and volume by the employment of vacuum forces in conduit 11 of the order of 16″ Hg and employment of direct pressure forces in the remainder of the system, i.e. in conduit 14, of approximately one p.s.i. In this regard, also, no reliance is placed upon any aspirating effect of nozzle Y for conveying purposes in conduit 11. Such aspiration as might exist is unstable, weak and ineffective to convey the materials intended to be conveyed by the invention or at the high volume of which the invention is capable. Such aspiration as may be present has been used in past suction systems in which the article conveyed, such as the piston-like message carrier, for example, filled or substantially filled the conduit. In the present invention the concept of conveying a tight fitting item by differential pressures on opposite sides thereof is avoided and the materials are conveyed by carrying them in and as a part of an air stream created for an initial part of their excursion solely by a powerful, steady vacuum and for substantially the entire remainder of their excursion in and as a part of an air stream created solely by direct, positive pressure. The items are not sucked or drawn from the vacuum to the pressure side by aspiration at nozzle passage Y but fly across the relatively minute and abrupt transition zone created by thin baffle 9 at the velocity of the air stream in conduit 11.

It is anticipated that the nozzle passage Y or YY will be appropriately set to create and maintain the air lock above described, taking into account the nature and volume of materials to be conveyed, the volume and velocity of air, the conduit diameter and similar known factors. Once the desired width of the nozzle Y or YY has been set, the conduit portion 14 and housing 1 may be suitably locked together by any desired means (not shown) to insure maintenance of said nozzle setting. Similarly, markings (not shown) may be provided on the outer surface of conduit portion 14 adjacent aperture 6 for visual indication of the width of nozzle Y or YY when the housing 1 is formed of opaque material.

Whereas there has been shown and described an operative form of the invention, it should be understood that this showing and description are taken to be in an illustrative or diagrammatic sense only. There are many modifications in and to the invention which will be apparent to those skilled in the art and which will fall within the scope and spirit of the invention.

There is claimed:

1. Means for conveying materials including a housing, a first conduit having an inlet end outside said housing and an outlet end inside said housing, a second conduit having an inlet end inside said housing and an outlet end outside said housing, said first conduit outlet end and said second conduit inlet end being spaced apart along a common axis within said housing, a frusto-conical baffle positioned in said housing to divide said housing into a vacuum chamber and a pressure chamber, said baffle having a central aperture and having a portion surrounding said aperture positioned between said first conduit outlet end and said second conduit inlet end with said portion spaced axially from both of said ends, the inner diameters of said first conduit, said baffle aperture and said second conduit being substantially equal, said baffle defining with the ends of said conduits annular passages between said conduits and the housing chambers, an outlet passage formed in said housing from said vacuum chamber, an inlet passage formed in said housing for communication with said pressure chamber, and a vacuum-pressure generator having its vacuum side communicating with said outlet passage and its pressure side communicating with said inlet passage.

2. The structure of claim 1 further characterized in that the outlet end of said first conduit and the inlet end of said second conduit are chamfered so that each of the annular passages formed by the baffle and said ends is of constant width.

3. The structure of claim 1 further characterized in that the width of the annular passage between the outlet end of said first conduit and said baffle is greater than the width of the annular passage between the inlet end of said second conduit and said baffle.

4. The structure of claim 1 further characterized in that at least one of said conduits is moveable axially relative to said baffle.

5. The structure of claim 1 further characterized in that said second conduit has a frusto-conical flange at its inlet end which extends parallel to said baffle to increase the length of said annular passage between said end and said baffle.

6. Means for conveying materials including a housing, a first conduit having an inlet end outside said housing and an outlet end inside said housing, a second conduit having an inlet end inside said housing and an outlet end outside said housing, said first conduit outlet end and said second conduit inlet end being spaced apart along a common axis within said housing, a frusto-conical baffle positioned in said housing to divide said housing into a vacuum chamber and a pressure chamber, said baffle having a central aperture and having a portion surrounding said aperture positioned between said first conduit outlet end and said second conduit inlet end with said portion being spaced axially from at least one of said ends, the inner diameters of said first conduit, said baffle aperture and said second conduit being substantially equal, said baffle defining with one of said conduit ends an annular passage between said conduit end and one of the housing chambers on one side of said baffle, a passage between the other of said conduits and the other of said housing chambers on the opposite side of said baffle, an outlet passage formed in said housing from said vacuum chamber, an inlet passage formed in said housing for communication with said pressure chamber and a vacuum-pressure generator having its vacuum side communicating with said outlet passage and its pressure side communicating with said inlet passage.

References Cited by the Examiner

UNITED STATES PATENTS

| | | | |
|---|---|---|---|
| 1,289,825 | 12/1918 | Lauen | 302—23 |
| 2,624,641 | 1/1953 | Smith | 302—2 |
| 2,630,350 | 3/1953 | Berg | 302—23 |
| 3,205,016 | 9/1965 | Panning | 302—23 |

FOREIGN PATENTS

| | | |
|---|---|---|
| 1,099,520 | 3/1955 | France. |

ANDRES H. NIELSEN, *Primary Examiner.*

EVON C. BLUNK, *Examiner.*